United States Patent [19]

Przywozny

[11] Patent Number: 5,784,240

[45] Date of Patent: Jul. 21, 1998

[54] METHOD AND APPARATUS FOR LIMITING CURRENT SURGE UPON TRANSFER OF A LOAD BETWEEN A.C. POWER SOURCES

[75] Inventor: Walter Przywozny, Whippany, N.J.

[73] Assignee: Automatic Switch Company, Florham Park, N.J.

[21] Appl. No.: 772,089

[22] Filed: Dec. 20, 1996

[51] Int. Cl.[6] ................................................ H02H 3/18
[52] U.S. Cl. ..................... 361/85; 361/76; 307/87; 307/127; 307/129
[58] Field of Search ........................ 361/76, 85, 78, 361/71; 307/64, 68, 70, 85–87, 116, 127, 129

[56] References Cited

U.S. PATENT DOCUMENTS

| 4,256,972 | 3/1981 | Wyatt et al. | 307/68 |
| 4,405,867 | 9/1983 | Moakler et al. | 307/64 |
| 4,717,998 | 1/1988 | Cheron et al. | 363/71 |
| 4,879,624 | 11/1989 | Jones et al. | 361/65 |
| 5,311,066 | 5/1994 | Malloy et al. | 307/87 |
| 5,555,151 | 9/1996 | Baker et al. | 361/79 |

*Primary Examiner*—Jeffrey A. Gaffin
*Assistant Examiner*—Michael J. Sherry
*Attorney, Agent, or Firm*—Levine & Mandelbaum

[57] ABSTRACT

A method of and apparatus for actuating an automatic transfer switch for disconnecting a motor load from a normal source of voltage and reconnecting the load to an alternate source of voltage at a time when phase differences between the output voltage of the disconnected motor load and of the alternate source voltage are minimized to prevent excessive in-rush currents to the motor upon reconnection. Actuation of the transfer switch is commenced when the difference in phase between the normal source and alternate source is equal to a predetermined number of degrees depending upon whether the alternate source frequency is greater or less than the normal source frequency.

12 Claims, 4 Drawing Sheets

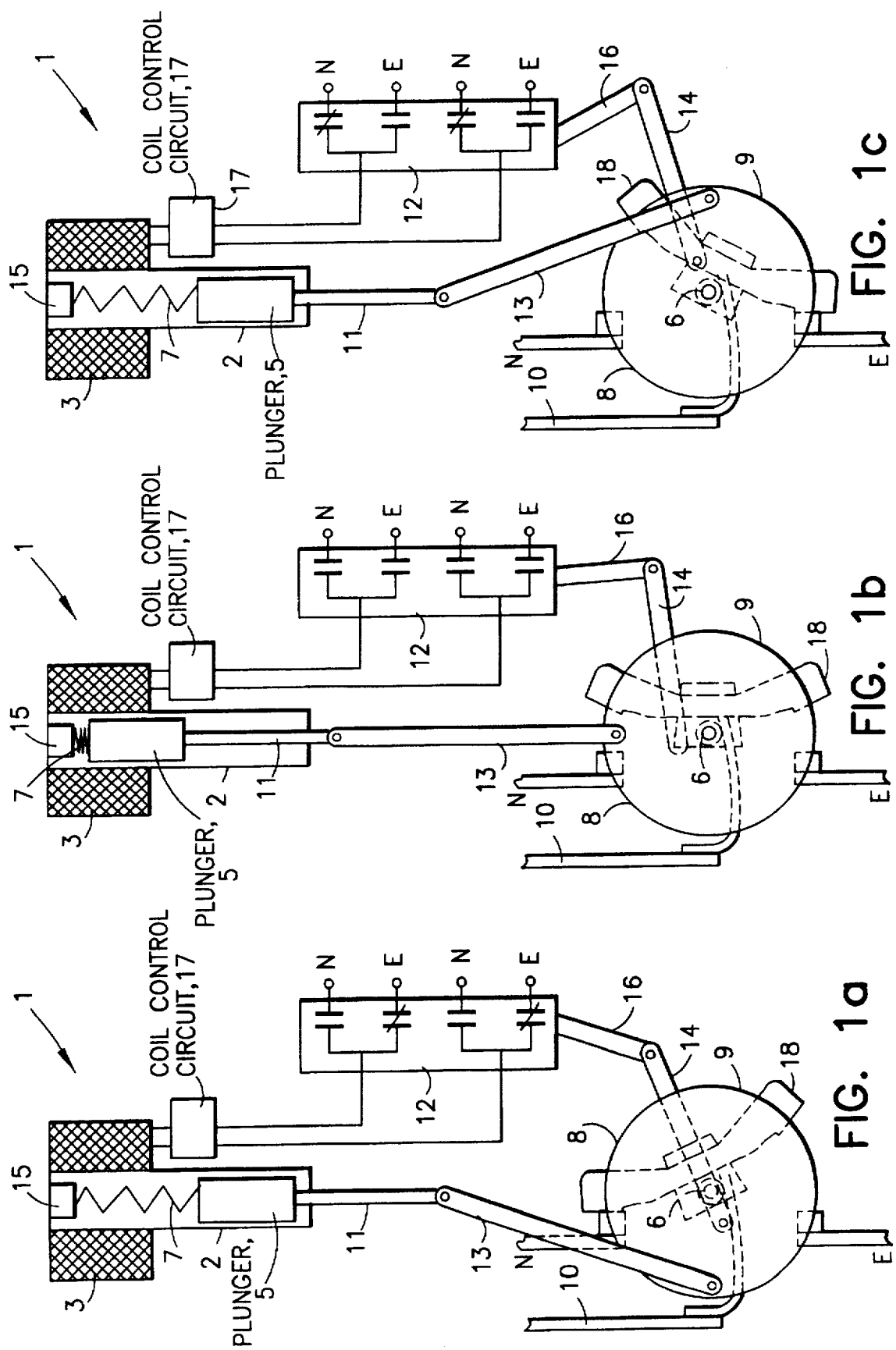

METHOD AND APPARATUS FOR LIMITING CURRENT SURGE UPON TRANSFER OF A LOAD BETWEEN A.C. POWER SOURCES

BACKGROUND OF THE INVENTION

This invention relates to the transfer of motor loads from a normal source of A.C. power to an alternate, e.g., emergency, source of A.C. power. More specifically, the invention is directed to a method of, and the construction of apparatus for, synchronizing the output voltage generated by a free spinning motor load with the alternating voltage of a an A.C. power source to which the motor is being transferred, e.g., after a power failure in the normal source.

Transfer of motor loads has long been problematical due to the tendency of motors to draw excessive currents when connected to an out-of-phase source. When an operating motor is disconnected from a transferor voltage source, due to the inertia of its spinning rotor, the motor acts as a generator having an output voltage with frequency and voltage characteristics independent of the characteristics of the normal and alternate source voltages. These frequency and voltage characteristics are functions of the motor construction, its shaft load, and initial voltage conditions.

Ideally when reconnecting a spinning motor to a transferee A.C. voltage source, it is desirable to wait until the amplitude of the output voltage generated by the free spinning motor decays to zero, or at least to a level where reconnection of the free spinning motor to a live voltage source does not cause excessive in-rush surge current. However such a delay in reconnection often cannot be tolerated, e.g., in hospitals where such motors are operating life sustaining apparatuses and in industrial facilities where the motors are driving machinery critical to chemical processes. Also there are instances where electrically operated motor starters may drop out thereby requiring manual restarting of a motor after each transfer.

In instances where the frequency difference between sources is large, the phase relationship between them changes rapidly. When transferring a motor between two sources which are not in phase the voltage across the motor terminals can be as high as the sum of the two source voltages. Hence, by the time transfer is completed, the phase difference can be quite large, resulting in harmful in-rush current surges notwithstanding that transfer was initiated when the sources were in phase.

It is desirable to limit the motor in-rush current to the normal starting current which is typically 6 times running current. It can be seen that if the motor and transferee source voltages are 180 degrees out of phase and equal in magnitude, then the motor voltage can be twice the source voltage. This could result in an in-rush current surge of 12 times steady state running current. This excessive current can cause tripping of circuit breakers and damage to motor shafts and circuitry.

Most prior art motor load transfer techniques rely on motor interruptions and time delay to insure sufficient decay of the output voltage of a free spinning motor before it is reconnected to a voltage source. This type of transfer can be accomplished utilizing a three position transfer switch where the motor is disconnected from the operating source and is held in a disconnected position for a predetermined period of time until the output voltage drops to zero, after which, transfer is completed to the alternate source.

The foregoing prior art technique uses a transfer switch with a timed center off position that allows the residual voltage to decay before reconnection of the load to the opposite source. The time in the center position is adjustable and is normally set for 0.5 to 3 seconds depending on load characteristics. This technique is suitable for both motor and transformer loads. However, the load can be without power for 0.5 to 3 seconds, even during routine testing, e.g., resulting in momentary darkness when the load circuit includes lighting, and motor starters may drop out requiring them to be manually reset unless they are equipped to be automatically restarted. It is also possible for the transfer switch to become disabled in the center position, in which case the loads are permanently disconnected from both the transferor and transferee sources.

The foregoing prior art approach can be also taken with a standard two position transfer switch. In the latter case, a controller causes the motor starter to disconnect at a predetermined time before transfer is initiated. The free spinning motor is then permitted to stop and the resultant motor output voltage to drop to zero volts before reconnection to the alternate source.

SUMMARY OF THE INVENTION

The aforementioned problems of the prior art are overcome by the instant invention which provides for apparatus and a method that relies on reconnection of the motor load to the alternate source when the normal and alternate sources are nearly "in phase", i.e., have phase differences of no more than 60 degrees.

If the phase difference between the output voltage of the free spinning motor and the source to which the motor is being connected is 60 degrees or less, then the vector sums of the two voltages will not exceed normal starting voltage and the in-rush current upon connection of the motor to the transferee source will be no greater than the normal starting current. The method and apparatus of the invention insure that at the moment of reconnection of the free spinning motor to the transferee voltage source the output voltage of the motor being transferred has a phase within 60 electrical degrees of the transferee source voltage.

Achievement of a reconnection phase difference of 60 degrees or less between motor load and transferee A.C. power source is difficult due to uncertainties in how the regenerated output voltage and frequency of the free spinning motor will change with respect to time due to a host of factors, including motor characteristics and motor loading which are highly dynamic and difficult to predict. The method and apparatus of the invention monitor or otherwise take into account parameters that are capable of measurement, including transfer switch idle time, absolute value of the frequency of both sources, frequency difference, relative change of voltage vectors (phase angle increasing or decreasing between sources) and circuit sensing delays. This information allows an advance angle to be calculated so that transfer can be initiated before the output voltage of the motor and alternating voltage of the transferee source are in phase, and completed with the phase difference between the free spinning motor load and transferee source being no more than 60 degrees.

It is therefore an object of the invention to determine an advance phase difference angle between transferor and transferee source voltages for initiation of transfer of a motor load to minimize the phase difference between the transferee source voltage and the output voltage of the load at reconnection of the load to the source.

Another object of the invention is to initiate transfer at an advance angle that will insure lift off of the transfer switch contacts at 0 degrees or 60 degrees phase difference between the voltages of the transferor and transferee sources, depending on which of the sources has the greater frequency.

Still another object of the invention is to provide the maximum opportunity to reconnect a motor load to a transferee source of A.C. voltage with a phase difference between the output voltage of the motor load and the alternating voltage of the transferee source of no more than 60 degrees.

Other and further objects of the invention will be apparent from the following drawings and description of a preferred embodiment of the invention in which like reference numerals are used to indicate like parts in the various views.

DESCRIPTION OF THE DRAWINGS

FIG. 1a is a mechanical schematic view illustrating part of the apparatus of the invention in a first state.

FIG. 1b is a mechanical schematic view illustrating part of the apparatus of the invention in a second state.

FIG. 1c is a mechanical schematic view illustrating part of the apparatus of the invention in a third state.

DESCRIPTION OF THE PREFERRED EMBODIMENT

Figure 2B:
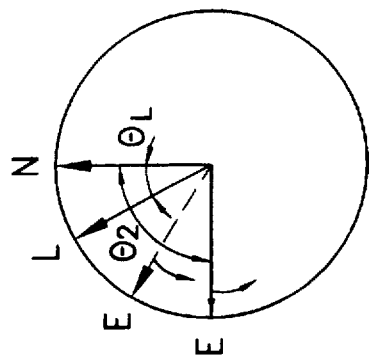
FIG. 2b is a vector diagram illustrating the relative phases of voltages generated in the environment of the invention at a second time.

Referring now to FIGS. 1a, b, and c of the drawings, there is schematically shown an automatic transfer switch 1 in three of its dispositions. In FIG. 1a, the automatic transfer switch 1 has its main contacts connected to the normal source of power N, i.e., to connect a motor load 10 to the normal source of power which is typically the service provided by an electric utility company. In the event of a power failure or substantial interruption of power from the normal source, the automatic transfer switch 1 is actuated to transfer the motor load 10 from the transferor normal power source N to a transferee emergency or other alternate power source E by disconnecting the main contacts from the normal power source N and connecting the main contacts to the alternate source E.

The automatic transfer switch control system circuitry senses the interruption of power from the normal source and transfers to the alternate source which begins to apply its voltage at contacts E to a transfer switch actuating circuit including a relay 17 for energizing the transfer switch solenoid coil 3, thereby drawing the solenoid plunger 5 inwardly from its rest position toward a pole piece or stop 15 which is surrounded by the coil 3. The force exerted by the pole piece 15 on the solenoid plunger 5 is greater than the opposing force of a return spring 7 on the plunger 5. Accordingly, a disc-shaped weight 8 which is mounted on a shaft 6 to form part of an armature 9 of the transfer switch 1 is pulled by a link 13 pivotally connected to a rod 11 extending from the plunger 5 to cause clockwise rotation of the armature 9 in the views of FIGS. 1a, b, and c. Also mounted on the shaft 6 are moveable contacts 18 (one of which can be seen in FIGS. 1a, b, c) which are rotatable with the shaft 6 for transferring the load 10 between the normal power source N (FIG. 1a) and the alternate power source E (FIG. 1c).

The plunger 5 is drawn inwardly in response to the electromagnetic force of the pole piece 15 caused by the coil current until the plunger 5 is almost in engagement with the plunger stop 15 (FIG. 1b). At this time the armature 9 has rotated almost to top dead center where the disc link 13 is in axial alignment with the solenoid plunger 5, solenoid plunger rod 11, and axis of rotation of the armature 9, including the shaft 6 and weight 8. In this position, application of voltage from the alternate source E to the solenoid coil 3 is interrupted by the actuation of switch contacts 12 of a coil voltage switch having a control arm 16 which is pivotally connected to one end of a link 14, the other end of which is rotatably mounted on the armature 9.

The switch contacts 12 are connected to the arm 16. At this time the motor load 10 is freely spinning due to the inertia of its rotor (not shown). When the arm 16 is in the leftmost position as shown in FIG. 1a, the switch contacts 12 connect the coil control circuit 17 to the alternate source of power E. When the arm 16 is in the intermediate position as shown in FIG. 1b, the switch contacts 12 do not connect the coil control circuit 17 to the normal source of power N or the alternate source of power E. When the arm 16 is in the rightmost position as shown in FIG. 1c, the switch contacts 12 connect the coil control circuit 17 to the normal source of power E.

The switching arrangement is such that when the load 10 is connected to draw power from the normal source contacts N (FIG. 1a), the coil control circuit 17 draws power for the solenoid coil from the alternate source contacts E. Conversely, when the load is connected to draw power from the alternate source contacts E, the coil control circuit 17 draws power for the solenoid coil 3 from the normal source contacts N (FIG. 1c).

Assume a load 10 to be transferred from a normal (transferor) source to an alternate (transferee) source is an induction motor with 5% slip, that the normal and alternate voltage sources are available and are at 100% of nominal voltage, that the alternate source is a generator, the normal source is a utility, and the generator frequency is slightly less than the frequency of the utility source.

Figure 2D:
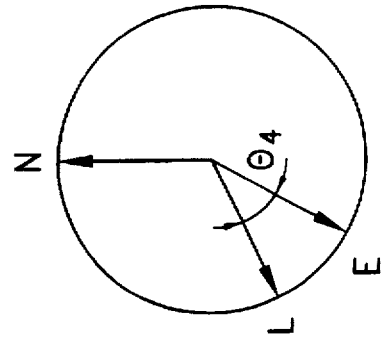
FIG. 2d is a vector diagram illustrating the relative phases of voltages generated in the environment of the invention at a fourth time.
Figure 2A:
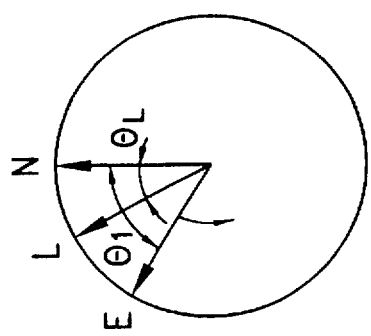
FIG. 2a is a vector diagram illustrating the relative phases of voltages generated in the environment of the invention at a first time.

Referring to FIG. 2a, the voltage vectors of the sources and motor load are shown. The load voltage vector L and the normal source vector N are frequency locked and separated by the load angle $\theta_L$. The alternate source vector E is rotating counter clockwise with respect to the normal source and load vectors. When the normal and alternate sources are within a pre-determined phase displacement $\theta_1$, the transfer process is initiated.

In order to determine the phase angle of the output voltage of the motor load at completion of transfer of the load to the alternate source, the total elapsed time from in phase detection and transfer initiation to transfer completion (total transfer time) must be known. Transfer of the load from the normal source to the alternate source consists of four sequential events. The total transfer time is equal to the sum of the durations of each of the four events.

$t_1$=The time from in phase detection to output relay coil energization.

$t_2$=The time for the output relay to energize the transfer switch coil.

$t_3$=The time required for the transfer switch to start moving (idle time).

$t_4$=The time from separation of the main contact of the transfer switch from the contact connected to the transferor source (FIG. 1a) until reconnection of the main contact to the contact connected to the transferee source (FIG. 1c), i.e., the hot to hot time of the transfer switch.

The time $t_1$ from in phase detection to energization of the output relay coil, in order to actuate the transfer switch, is normally limited to microseconds and is negligible in comparison to $t_2$, $t_3$ and $t_4$.

Output relay energization time $t_2$ has a typical range of from 10 to 20 milliseconds depending on the characteristics of the relay 17 which actuates the transfer switch 1 upon closure of the relay contacts to apply the actuating voltage to the solenoid coil 3 of the transfer switch 1.

Idle time $t_3$ has a typical range of from 20 to 58 milliseconds depending on the ampere rating of the transfer switch 1.

Hot to hot time $t_4$ can vary from 52 to 105 milliseconds also, depending on the ampere rating of the transfer switch.

Accordingly, the total time ($t_1+t_2+t_3+t_4$) from detection of an in phase condition to the completion of transfer can be in the range of 82 to 183 milliseconds in a typical load transfer environment. These values can be used for determining the phase relationships between the load and the sources at the completion of transfer.

Referring now to FIG. 2b, it can be seen that the alternate source vector E has moved counter clockwise to a new angle $\theta_2$ with respect to the load and normal source vectors due to the frequency difference between the voltage of the normal (transferor) source and the voltage of the alternate source. The phase change occurring from when the in phase condition was initially detected is essentially a function of the relay energization time $t_2$, the transfer switch idle time $t_3$, and the frequency difference between the transferor and transferee sources. A, the angular displacement in degrees during this time can be calculated from the following relationship.

$A=0.36(\Delta F)(t)$

Where:

$\Delta F$=Frequency Difference (Hz) between the transferor source and transferee source t=time interval (ms)

EXAMPLE 1

Normal (transferor) source voltage frequency=60.0 Hz

Alternate (transferee) source voltage frequency=58.5 Hz

Relay Time $t_2$=15 ms

Transfer Switch Idle Time $t_3$=50 ms

Angle of Initiation of Transfer=$\theta_1$

The number of degrees that the voltage vectors of the load and alternate sources have moved in relation to the normal source voltage vector from detection of the in phase condition until the time of disconnection of the motor load is the advance angle and is calculated as follows.

$A=0.36(\Delta F)(t)$ $A=0.36(60-58.5)(15+50)$ $A=35.1$ degrees

This value represents the additional phase displacement from $\theta_1$, therefore the total phase displacement between sources, ($\theta_2$) would be the sum of A and $\theta_1$ or $35.1+\theta_1$ degrees.

Figure 2C:
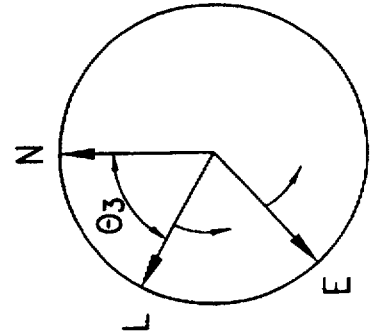
FIG. 2c is a vector diagram illustrating the relative phases of voltages generated in the environment of the invention at a third time.

The load remains in synchronism with the normal source until its disconnection from the normal source. Once the transfer switch disconnects the motor from the normal source, the free spinning motor becomes a generator, in effect another voltage source, and its voltage vector begins to rotate relative to the normal and alternate sources as shown in FIG. 2c. The rate of angular displacement of the motor voltage vector is influenced by motor slip and motor load. The motor load voltage vector will always move counter clockwise with respect to the normal source since the motor speed decreases upon disconnection from the normal source due to loading and the resultant slip frequency.

In order to limit in-rush current surges upon reconnection of the free spinning motor load to the alternate source, it is desired to minimize the phase displacement between the load and the alternate source. A successful transfer occurs when the phase displacement between the load output voltage vector and the alternate source voltage vector is 60 degrees or less. If the phase and frequency of the free spinning motor load output voltage changes minimally when the motor load is disconnected from the transferor source, then reconnection to the transferee source will occur with a phase difference between the motor load output voltage and transferee source voltage of 60 degrees or less, which is acceptable. If the phase and frequency of the output voltage of the free spinning motor change at a rapid rate then reconnection can still be accomplished with a phase difference between the motor and transferee source voltage vectors within 60 degrees even though the voltage vectors rotate relative to one another by as much as 120 degrees during the hot to hot time, i.e., from transfer switch "lift off" causing disconnection of the motor load from the transferor (normal) source until connection of the motor to the transferee source.

Once the load is disconnected from the normal source, the load output voltage vector is free to rotate independently until the load is reconnected to the alternate source. Independent rotation of the load output voltage vector occurs for the period of time the load is disconnected from both sources, i.e., the hot to hot time $t_4$ of the transfer switch. Part of the angular displacement between the normal source and motor output voltage vectors during this period can be calculated using the previously stated relationship $A=0.36(\Delta F)t_4$ where $\Delta F$ is the frequency difference between the normal source and the motor output voltage frequency during disconnect. From this relationship, the phase change between the normal source voltage vector and load output voltage vector attributable to motor slip and load during the hot to hot time of the transfer switch can be determined.

The slip frequency component of the rate at which the load output voltage vector separates from the normal source voltage vector can be calculated from the following:

$$\text{Synchronous RPM} = \text{Hertz} \frac{120}{\text{Poles}}$$

Motor Slip Frequency=(%Slip) (Source Frequency)

$$\% \text{ Slip} = \frac{\text{Synchronous RPM} - \text{Full Load RPM}}{\text{Synchronous RPM}}$$

Under conditions of a motor load with 5% slip and a normal source voltage frequency of 60 Hz, the slip frequency can be calculated by multiplying 0.05 times 60 Hz to obtain a slip frequency of 3 Hz. This means that the motor voltage vector will start moving counter clockwise with respect to the normal source voltage vector at a frequency of 3 Hz the instant the motor is disconnected from the normal voltage source.

The other factor which is a component of the rate at which the load output voltage vector separates from the normal voltage source vector during the hot to hot time is the physical load on the motor which causes it to slow during the hot to hot time, beyond what is expected due to slip. That is, the actual rate at which the motor and normal source voltage vectors are separating is greater than the slip frequency.

The magnitude of the physical load also affects the phase angle between the motor output voltage and the voltage at its terminals while it is still connected to the normal source. As soon as the motor is disconnected from the normal source there is an instantaneous phase shift of the motor voltage with respect to the normal source voltage due to the load angle. The load angle varies with the physical loading of the motor and can measure 0 degrees or more depending on the amount of loading on the motor. Typically, this angle is small and can be neglected.

Due to the numerous factors that affect phase displacement of the motor output voltage during the hot to hot time, prediction of the exact phase displacement at the instant that the motor is reconnected to the alternate source is difficult. However, a reasonably accurate estimate can be made from known information due to the short duration of the hot to hot time.

Referring to FIG. 2c, the phase displacement of the motor output voltage vector $\theta_3$ from the normal source voltage vector is the sum of the load angle and the angle of movement of the motor output voltage vector during the hot to hot time. The alternate source voltage vector rotates relative to the normal source voltage vector during the hot to hot time at a rate equal to the frequency difference between the normal and alternate sources. The phase displacement of the alternate source voltage vector with respect to the reference normal source voltage vector during the hot to hot time can be computed from $A=0.36(\Delta F)t_4$ where $\Delta F$ is the frequency difference between the normal and alternate sources. Hence the total phase displacement of the alternate source voltage vector from the normal source voltage vector can be calculated from $A=0.36(\Delta F)(t_2+t_3+t_4)$.

The phase displacement $\theta_4$ between the free spinning motor output voltage and the alternate source voltage at the instant before connection of the motor to the alternate source is the difference between the angle of travel of the alternate source voltage vector from the normal source voltage vector and the angle of travel of the motor output voltage vector from the normal source voltage vector. Referring to FIG. 2d, at the completion of transfer, the load output voltage vector L is locked in phase with the alternate source voltage vector E, the latter two vectors being separated by the load angle.

In the foregoing example, it was assumed that the alternate source was at a slightly lower frequency than the frequency of the normal source. Therefore, the alternate source voltage vector was rotating counter clockwise with respect to the normal source voltage vector. If the alternate source voltage vector was slightly higher in frequency than the normal source voltage vector, the alternate source voltage vector would be rotating clockwise with respect to the normal source voltage vector. However, the same method of analysis of the vectors would apply.

Also, in the preceding example, it was assumed that the direction of transfer was from the normal source to the alternate source, i.e., the normal source was the transferor source and the alternate source was the transferee source. Transfer from the alternate source to the normal source would also be analyzed the same way except that the alternate source voltage vector would be the reference vector instead of the normal source voltage vector as was the case in the example. The load output voltage vector would be in synchronism with the alternate source, the slip frequency would be a percentage of the alternate source voltage frequency instead of the normal source voltage frequency, and the transfer times would be measured from disconnection of the load from the alternate source to reconnection to the normal source. The free spinning motor output voltage vector always rotates counter clockwise with respect to the source from which it is disconnected, i.e., the transferee source.

Figure 3:
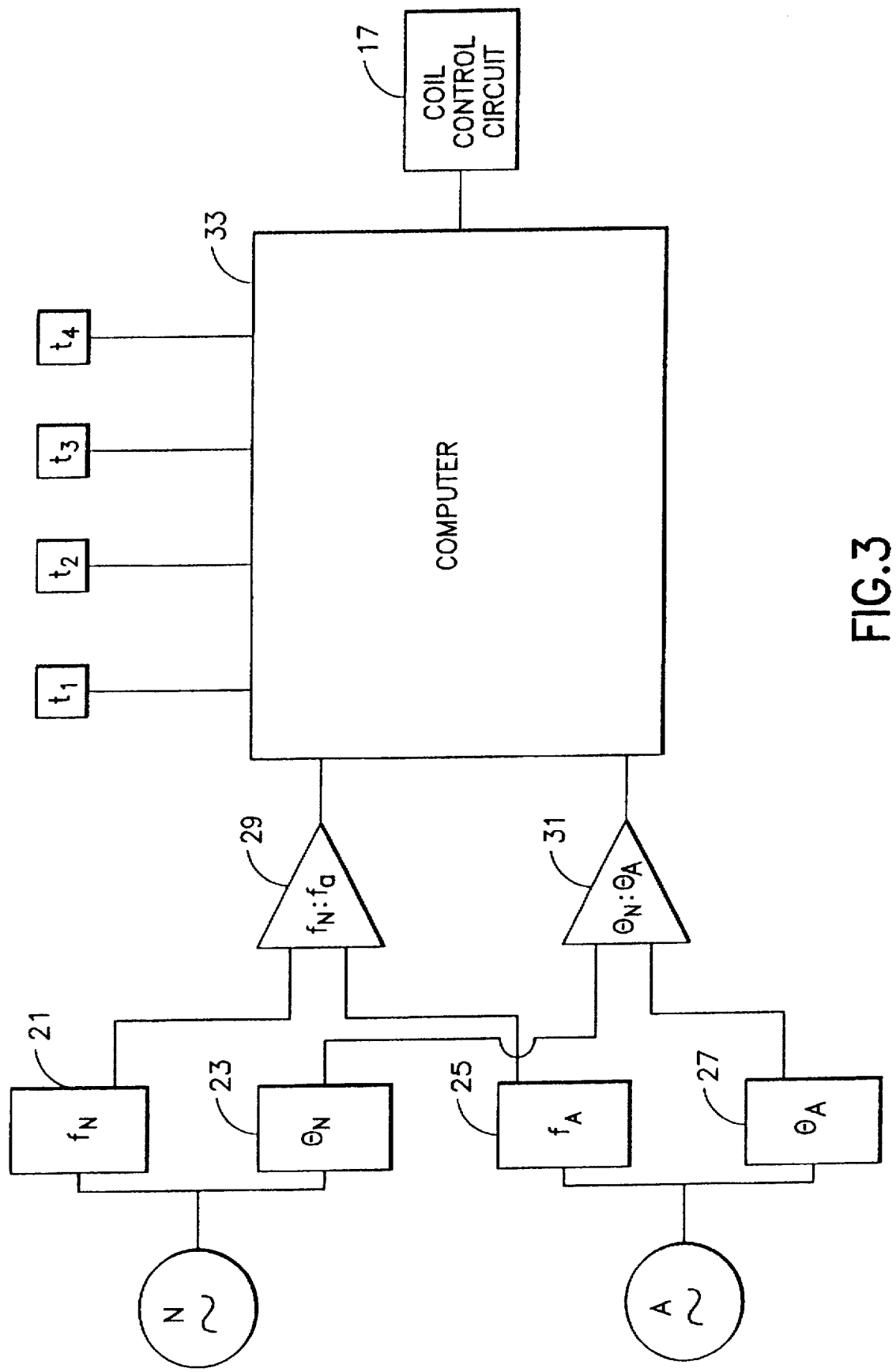
FIG. 3 is a schematic block diagram of another part of the apparatus of the invention.

Referring now to FIG. 3, a normal source voltage frequency measurement circuit 21 and a normal source voltage phase measurement circuit 23 are connected to the normal voltage source N. Similarly, an alternate source voltage frequency measurement circuit 25 and an alternate source voltage phase measurement circuit 27 are connected to the normal voltage source A. The normal source voltage frequency measurement circuit 21 receives the normal source voltage at its input terminal and produces at its output terminal a signal indicative of the frequency of the normal source voltage. Likewise, the alternate source voltage frequency measurement circuit 25 receives the alternate source voltage at its input terminal and produces at its output terminal a signal indicative of the frequency of the alternate source voltage.

The normal source voltage phase measurement circuit 23 receives the normal source voltage at its input terminal and produces at its output terminal a signal indicative of the phase of the normal source voltage. Likewise, the alternate source voltage phase measurement circuit 27 receives the alternate source voltage at its input terminal and produces at its output terminal a signal indicative of the phase of the alternate source voltage.

The output signals from the normal source voltage frequency measurement circuit 21 and alternate source voltage frequency measurement circuit 25 are applied to the input terminals of a frequency comparator circuit 29. The frequency comparator circuit 29 produces a signal at its output terminal indicative of whether the frequency of the normal voltage source N is greater or less than the frequency of the alternate voltage source A.

The output signals from the normal source voltage phase measurement circuit 23 and alternate source voltage phase measurement circuit 27 are applied to the input terminals of a phase comparator circuit 31. The phase comparator circuit 31 produces a signal at its output terminal indicative of the difference between the phases of the normal source voltage and the alternate source voltage.

The output signals from the comparators 29 and 31 are applied to a computer 33 as are signals indicative of the transfer times $t_1$, $t_2$, and $t_3$ for the transfer switch in use. The transfer times $t_1$, $t_2$, and $t_3$ can be measured by testing one or more representative samples of a group of like transfer switches. Alternatively, apparatus for measuring the times $t_1$, $t_2$, and $t_3$ can be included in the transfer switch actuating device.

The characteristics of the load output voltage while the load is disconnected from both sources, i.e., during the hot to hot time, are not known. However, the hot to hot time is relatively small compared to the overall transfer time. The time characteristics of the transfer switch and sensing circuitry are known for a particular transfer switch. The frequency difference between sources can be measured. And it may be expected that the frequency of the load output voltage will decrease relative to the frequency of the transferor source voltage under typical conditions.

It is necessary to compensate for relay time, transfer switch idle time and source frequency differences. By compensating for known factors, up to a 60 degree phase change of the load output voltage due to unknown angular phase slip during the hot to hot time can be tolerated. The following conditions should be established in order to successfully accomplish in phase transfer.

1. The normal and alternate source voltages must be approaching synchronism, i.e., the phase angle between them must be approaching 0 degrees.
2. The total time from the detection of an in phase condition to the instant before disconnection of the load from the normal source must be known for the transfer switch in use.
3. The magnitude of the difference between the frequencies of the normal and alternate source voltages must be measured.
4. The sign of the difference between the frequencies of the normal and alternate source voltages must be determined, i.e. whether the frequency of the normal source voltage is greater or less than the frequency of the alternate source voltage.

In accordance with the invention, there are two critical phase angles between the normal source voltage and alternate source voltage at which lift off of the transfer switch main contact from the normal contact should occur in order to limit in-rush current to the transferred load from the transferee source. Initiation of transfer at the proper one of the critical phase difference angles maximizes the permissible degree of phase angle change in the output voltage of the load during the hot to hot time while insuring that the difference in phase between the free spinning motor load output voltage and the alternate source voltage will be no more than 60 degrees at the instant of reconnection.

It has been discovered that if the transferor source is higher in frequency than the transferee source, the critical angle is nominally 0 degrees. If the transferor source is lower in frequency than the transferee source the critical angle is nominally −60 degrees. Slight deviations, e.g., plus or minus ten degrees, from these values may occur while still providing acceptable results.

The advance angle, i.e., the phase displacement of the transferee source voltage vector from the transferor source voltage vector, is calculated to determine the time in the voltage cycle of the transferor source when actuation of the transfer switch should be commenced so that after the delays for the output relay to energize the transfer switch coil (relay time), and the time required for the transfer switch to start moving (idle time), disconnection of the load will occur at the desired critical phase angle (which depends on whether the normal source voltage or alternate source voltage has the greater frequency). The advance angle, in degrees, can be calculated from A 0.36($t_1+t_2+t_3$) ($\Delta F$), or just A 0.36($t_2+t_3$) ($\Delta F$) since $t_1$ is much less than $t_2+t_3$.

Figure 4A:
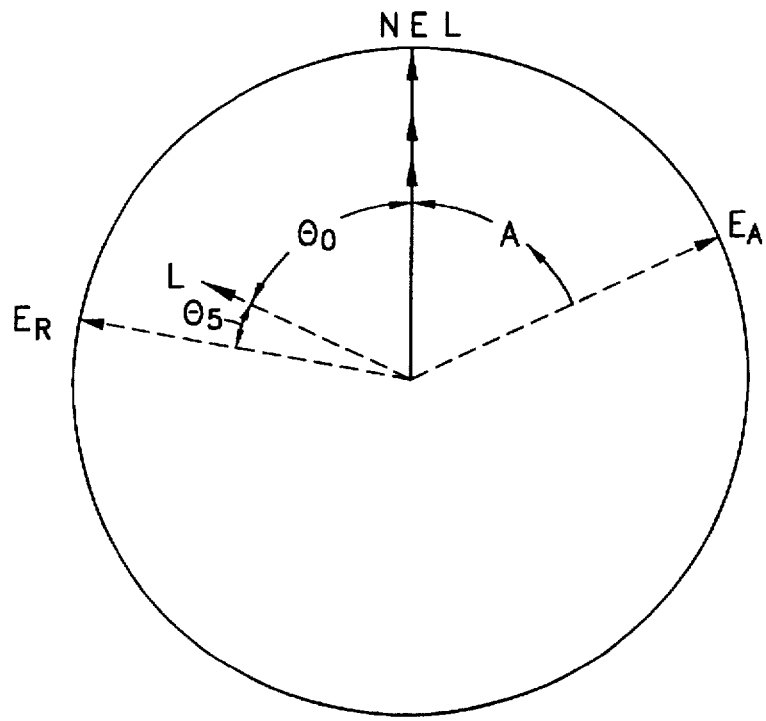
FIG. 4a is a vector diagram illustrating the relative phases of voltages generated in the environment of the invention under one condition.

Referring now to FIG. 4a, there is shown a vector diagram for the situation where the frequency of the transferor source is greater than the frequency of the transferee source. It is therefore desired to have a critical angle of 0 degrees, i.e., to have disconnection (lift off) occur when the transferee source voltage vector E is coincident with the transferor source voltage vector N. Because the transferee source voltage vector is rotating counter clockwise with respect to the transferor source voltage vector, the advance angle A is calculated and actuation of the transfer switch relay is commenced when the transferee source voltage vector is at $E_A$. Initially, the transfer switch 1 is as shown in FIG. 1a. After actuation of the transfer switch relay 17, when the transferee source voltage vector is at $E_A$, the transferee source voltage vector continues to travel through the advance angle A relative to the transferor source voltage vector during the relay time $t_2$ and idle time $t_3$ until the transferor source voltage vector and transferee source voltage vector are coincident at the moment that the load is disconnected from the transferor source. (See FIG. 1b). The motor of the load is then freely spinning and its voltage vector L continues to rotate with respect to the transferor source voltage vector through the angle $\theta_0$ until reconnection of the load to the transferee source the voltage of which is at $E_R$ at the time of reconnection. At this time the load voltage vector is displaced from the tranferee source voltage vector by angle $\theta_5$. (See FIG. 1c).

Figure 4B:
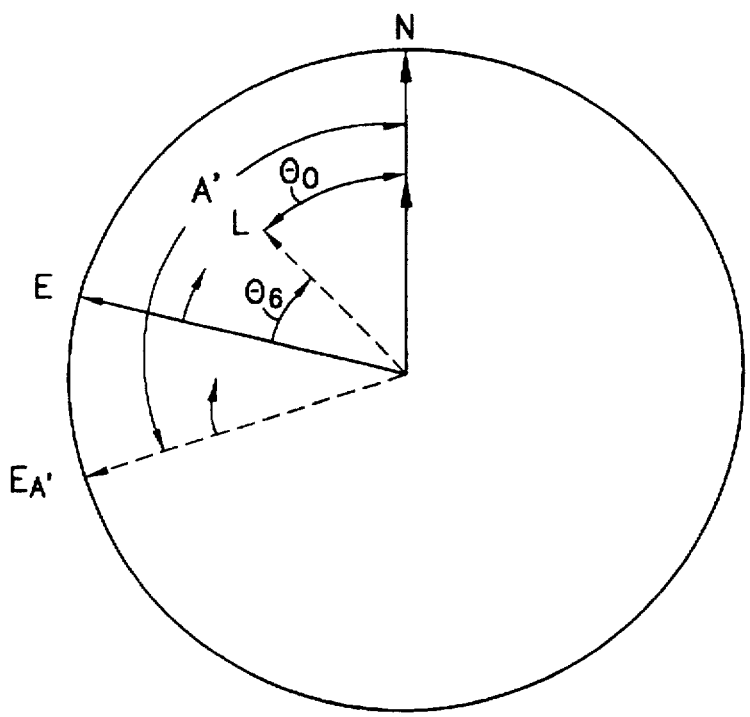
FIG. 4b is a vector diagram illustrating the relative phases of voltages generated in the environment of the invention under another condition.

Referring now to FIG. 4b, there is shown a vector diagram for the situation where the frequency of the transferor source is less than the frequency of the transferee source. It is therefore desired to have a critical angle of −60 degrees, i.e., to have disconnection (lift off) occur when the transferee source voltage vector E lags the transferor source voltage vector N by 60 degrees. Because the transferee source voltage vector is rotating clockwise with respect to the transferor source voltage vector, the advance angle A' is calculated and actuation of the transfer switch relay is commenced when the transferee source voltage vector is at $E_{A'}$. After actuation of the transfer switch relay when the transferee source voltage vector is at $E_{A'}$, the transferee source voltage vector continues to travel through the advance angle A relative to the transferor source voltage vector during the relay time $t_2$ and idle time $t_3$ until the transferee source voltage vector E is 60 degrees behind the transferor source voltage vector N at the moment that the load is disconnected from the transferor source. The motor of the load 10 is then freely spinning and its voltage vector L continues to rotate counter clockwise with respect to the transferor source voltage vector N through the angle $\theta_0$ until reconnection of the load to the transferee source. At this time the load voltage vector is displaced from the transferee source voltage vector by angle $\theta_6$.

In the following examples, the advance angles are calculated for a specific model of transfer switch and for various frequency differences to insure disconnect of the load occurred at 0 or −60 degrees.

Normal Frequency=60 Hz

Frequency Difference=±0.5, ±1.0, ±2.0, and ±3.0 Hz.

Motor Slip=0.5, 1.0, 2.0, and 3.0 hertz

Relay Time ($t_2$)=15 ms

| Average Transfer Switch Time (Automatic Switch Company Model 940 Transfer Switches) | | | |
|---|---|---|---|
| Ampere Size (Amps) | idle time $t_3$ | hot to hot time $t_4$ | idle + hot to hot time $t_3 + t_4$ |
| 30 | 28.0 | 41.5 | 69.5 |
| 100 | 20.3 | 35.0 | 55.3 |
| 150 | 19.5 | 34.5 | 54.0 |
| 400 | 22.3 | 33.3 | 52.5 |
| 800 | 34.0 | 50.5 | 84.5 |
| 1200 | 49.1 | 40.5 | 89.6 |
| 2000 | 56.5 | 47.0 | 103.5 |
| 3000 | 27.0 | 58.5 | 86.0 |

The numbers in the cells of the following tables are the angular displacements between the load and transferee source voltage vectors at the completion of transfer (reconnection of the load to the transferee source) for various size switches using the previously outlined parameters.

Fn=frequency of normal (transferor) source voltage

Fe=frequency of alternate (transferee) source voltage

Fl=frequency of load output voltage just before reconnection to alternate (transferee) source Fn-Fl (Hz)=Frequency difference between load and normal source.

Fn-Fe (Hz)=Frequency difference between normal and alternate source.

Fn>Fe=Normal frequency is higher than alternate frequency.

Fn<Fe=Alternate frequency is higher than normal frequency.

EXAMPLE 2

Automatic Switch Company Model 940 Transfer Switch (rated for 30 Amperes).

Fn>Fe

Disconnection of load from normal source takes place when the normal and alternate source voltages have a phase difference of 0 degrees.

| | Fn-Fl (Slip) | | | |
|---|---|---|---|---|
| Fn-Fe (Hz) | 0.5 Degrees | 1.0 Degrees | 2.0 Degrees | 3.0 Degrees |
| 0.5 | 0.0 | 7.5 | 22.4 | 37.3 |
| 1.0 | 7.4 | 0.0 | 15.0 | 29.9 |
| 2.0 | 22.4 | 15.0 | 0.0 | 14.9 |
| 3.0 | 37.3 | 29.9 | 14.9 | 0.0 |

Fn<Fe

Disconnection of load from normal source takes place when the normal and alternate source voltages have a phase difference of −60 degrees.

| −0.5 | 45.0 | 37.6 | 22.6 | 7.7 |
|---|---|---|---|---|
| −1.0 | 37.6 | 30.2 | 15.2 | 0.3 |
| −2.0 | 22.6 | 15.2 | 0.2 | 14.7 |
| −3.0 | 7.7 | 0.3 | 14.7 | 29.6 |

EXAMPLE 3

Automatic Switch Company Model 940 Transfer Switch (rated for 100–400 Amperes).

| Fn-Fe | 0.5 Degrees | 1.0 Degrees | 2.0 Degrees | 3.0 Degrees |
|---|---|---|---|---|
| | Fn > Fe Disconnection at 0 degrees. Fn-Fl (Slip) | | | |
| 0.5 | 0.0 | 6.1 | 18.5 | 30.8 |
| 1.0 | 6.1 | 0.0 | 12.4 | 24.7 |
| 2.0 | 18.5 | 22.4 | 0.0 | 12.3 |
| 3.0 | 30.8 | 24.7 | 12.3 | 0.0 |
| | Fn < Fe Disconnection at −60 degrees. Fn-Fl (Slip) | | | |
| −0.5 | 47.6 | 41.5 | 29.1 | 16.8 |
| −1.0 | 41.5 | 35.4 | 23.0 | 10.7 |
| −2.0 | 29.1 | 23.0 | 10.6 | 1.7 |
| −3.0 | 16.8 | 10.7 | 1.7 | 14.0 |

EXAMPLE 4

Automatic Switch Company Model 940 Transfer Switch (rated for 800 Amperes).

| Fn-Fe | 0.5 Degrees | 1.0 Degrees | 2.0 Degrees | 3.0 Degrees |
|---|---|---|---|---|
| | Fn > Fe Disconnection at 0 degrees. Fn-Fl (Slip) | | | |
| 0.5 | 0.0 | 9.1 | 27.3 | 45.4 |
| 1.0 | 9.1 | 0.0 | 18.2 | 36.3 |
| 2.0 | 27.3 | 18.2 | 0.0 | 18.1 |
| 3.0 | 45.0 | 36.3 | 18.1 | 0.0 |
| | Fn < Fe Disconnection at −60 degrees. Fn-Fl (Slip) | | | |
| −0.5 | 41.8 | 32.7 | 14.5 | 3.8 |
| −1.0 | 32.7 | 23.6 | 5.4 | 12.7 |
| −2.0 | 14.5 | 5.4 | 12.8 | 30.9 |
| −3.0 | 3.6 | 12.7 | 30.9 | 49.0 |

EXAMPLE 5

Automatic Switch Company Model 940 Transfer Switch (rated for 1200 Amperes).

| Fn-Fe | 0.5 Degrees | 1.0 Degrees | 2.0 Degrees | 3.0 Degrees |
|---|---|---|---|---|
| | Fn > Fe Disconnection at 0 degrees. Fn-Fl (Slip) | | | |
| 0.5 | 0.0 | 7.3 | 21.9 | 36.5 |
| 1.0 | 7.3 | 0.0 | 14.6 | 29.2 |
| 2.0 | 21.9 | 14.6 | 0.0 | 14.6 |
| 3.0 | 34.7 | 29.2 | 14.6 | 0.0 |
| | Fn > Fe Disconnection at 0 degrees. Fn-Fl (Slip) | | | |
| −0.5 | 45.4 | 38.1 | 23.5 | 8.9 |
| −1.0 | 38.1 | 30.8 | 16.2 | 1.6 |
| −2.0 | 23.5 | 16.2 | 1.6 | 13.0 |
| −3.0 | 8.9 | 2.0 | 13.0 | 27.6 |

EXAMPLE 6

Automatic Switch Company Model 940 Transfer Switch (rated for 2000 Amperes).

| Fn-Fe | 0.5 Degrees | 1.0 Degrees | 2.0 Degrees | 3.0 Degrees |
|---|---|---|---|---|
| Fn > Fe Disconnection at 0 degrees. Fn-Fl (Slip) | | | | |
| 0.5 | 0.0 | 8.5 | 25.5 | 42.5 |
| 1.0 | 8.5 | 0.0 | 17.0 | 34.0 |
| 2.0 | 25.5 | 17.0 | 0.0 | 17.0 |
| 3.0 | 42.5 | 34.0 | 17.0 | 0.0 |
| Fn < Fe Disconnection at –60 degrees. Fn-Fl (Slip) | | | | |
| –0.5 | 43.0 | 35.5 | 17.5 | 0.5 |
| –1.0 | 34.5 | 36.0 | 9.0 | 8.0 |
| –2.0 | 17.5 | 9.0 | 8.0 | 25.0 |
| –3.0 | 0.5 | 8.0 | 25.0 | 42.0 |

EXAMPLE 7

Automatic Switch Company Model 940 Transfer Switch (rated for 3000 Amperes)

| Fn-Fe | 0.5 Degrees | 1.0 Degrees | 2.0 Degrees | 3.0 Degrees |
|---|---|---|---|---|
| Fn > Fe Disconnection at 0 degrees. Fn-Fl (Slip) | | | | |
| 0.5 | 0.0 | 10.5 | 31.6 | 52.5 |
| 1.0 | 10.5 | 0.0 | 21.1 | 42.0 |
| 2.0 | 31.6 | 21.1 | 0.0 | 20.9 |
| 3.0 | 52.5 | 42.0 | 20.9 | 0.0 |
| Fn < Fe Disconnection at –60 degrees. Fn-Fl (Slip) | | | | |
| –0.5 | 39.0 | 28.5 | 7.4 | 13.5 |
| –1.0 | 28.5 | 18.0 | 3.1 | 24.0 |
| –2.0 | 7.4 | 3.1 | 24.2 | 45.1 |
| –3.0 | 7.5 | 18.0 | 39.1 | 60.0 |

From the foregoing examples, it is seen that the method described above limits the phase difference $\theta_0$ between the load and source voltage vectors, at the instant of load reconnection, to 60 degrees or less.

The hot to hot time of the transfer switch is the most critical time due to the uncertainty of the characteristics of the motor load output voltage when it is disconnected from both the normal and alternate voltage sources. By limiting the hot to hot time period, e.g., to 2 cycles for all models of transfer switches, even wider frequency differences between the sources and load may be tolerated. An effective method of reducing hot to hot times is through the use of solid state transfer switches where the time duration of load disconnect from the transferor and transferee sources is typically 8 milliseconds or less.

It is to be appreciated that the foregoing is a description of a preferred embodiment of the invention to which variations and modifications may be made without departing from the spirit and scope of the thereof.

What is claimed is:

1. A method of limiting surge current from a transferee source of A.C. power to a load upon transfer thereto from a transferor source of A.C. power by a transfer switch comprising, monitoring the frequency of the transferor source of power, monitoring the phase of the transferor source of power, monitoring the frequency of the transferee source of power, monitoring the phase of the transferor source of power, comparing the frequency of the transferor source of power with the frequency of the transferee source of power, determining the phase difference between the transferor source of power and the transferee source of power, energizing the transfer switch to effect transfer of the load from the transferor source of power to the transferee source of power when the phase difference between the transferor source of power and the transferee source of power is of a value in a first range of values, if the frequency of the transferee source of power is greater than the frequency of the transferor source of power, and energizing the transfer switch to effect transfer of the load from the transferor source of power to the transferee source of power when the phase difference between the transferor source of power and the transferee source of power is of a value in a second range of values, if the frequency of the transferee source of power is less than the frequency of the transferor source of power.

2. A method according to claim 1 wherein the load is inductive, and the first range includes phase differences of from –70 degrees to –50 degrees, and the second range includes phase differences of from –10 degrees to +10 degrees.

3. A method according to claim 2 wherein the load includes a motor.

4. A method according to claim 2 wherein the value of the phase difference between the transferor source of power and the transferee source of power at which the transfer switch is energized is –60 degrees when the frequency of the transferee source of power is greater than the frequency of the transferor source of power, and the phase difference between the transferor source of power and the transferee source of power at which the transfer switch is energized is 0 degrees when the frequency of the transferee source of power is less than the frequency of the transferor source of power.

5. A method of minimizing surge current from a transferee source of A.C. power to a motor load upon transfer thereto from a transferor source of A.C. power by a transfer switch comprising, monitoring the frequency of the transferor source of power, monitoring the phase of the transferor source of power, monitoring the frequency of the transferee source of power, monitoring the phase of the transferee source of power, comparing the frequency of the transferor source of power with the frequency of the transferee source of power, determining the phase difference between the transferor source of power and the transferee source of power, and if the frequency of the transferee source of power is greater than the frequency of the transferor source of power, energizing the transfer switch to effect transfer of the load from the transferor source of power to the transferee source of power when the phase of the transferor source of power is lagging the phase of the transferee source of power by sixty degrees, and if the frequency of the transferee source of power is less than the frequency of the transferor source of power, energizing the transfer switch to effect transfer of the load from the transferor source of power to the transferee source of power when the transferor source of power and transferee source of power are in phase.

6. A method according to claim 1 further comprising determining an advance angle for commencing actuation of the transfer switch before said time, said advance angle being a function of the time from commencement of said actuation of the transfer switch until disconnection of the load from the transferor source of power.

7. A method according to claim 6 wherein the advance angle is determined from the relationship $$A = 0.36(\Delta F)(t)$$

where $\Delta F$ = Frequency Difference (Hz) between the transferor source voltage and transferee source voltage, and $t$ = time from commencement of actuation of the transfer switch until disconnection of the load from the transferor source of power (ms).

8. Apparatus for transferring a load from a transferor source of A.C. power to a transferee source of A.C. power while limiting surge current from the transferee source of A.C. power to the load comprising, transfer switch means having an armature, a transferor contact operatively connected to said transferor source of power, a transferee contact operatively connected to said transferee source of power, load contact means operatively connected to said load, and actuating means for moving said armature from a transferor position in engagement with said transferor contact to a transferee position in engagement with said transferee contact for connecting said load to said transferor source and to said transferee source, respectively, transferor frequency monitoring means operatively connected to the transferor source of power for monitoring the frequency of the transferor source of power, transferor phase monitoring means operatively connected to the transferor source of power for monitoring the phase of the transferor source of power, transferee frequency monitoring means operatively connected to the transferee source of power for monitoring the frequency of the transferee source of power, transferee phase monitoring means operatively connected to the transferee source of power for monitoring the phase of the transferee source of power, frequency comparator means operatively connected to the transferor frequency monitoring means and transferee frequency monitoring means for comparing the frequency of the transferor source of power with the frequency of the transferee source of power, and phase comparator means operatively connected to the transferor phase monitoring means and transferee phase monitoring means for determining the phase difference between the transferor source of power and the transferee source of power, said actuating means being responsive to said frequency comparator means and phase comparator means for effecting transfer of the load from the transferor source of power to the transferee source of power when the phase difference between the transferor source of power and the transferee source of power is of a value in a first range of values, if the frequency of the transferee source of power is greater than the frequency of the transferor source of power, and said actuating means being responsive to said frequency comparator means and phase comparator means for effecting transfer of the load from the transferor source of power to the transferee source of power when the phase difference between the transferor source of power and the transferee source of power is of a value in a second range of values, if the frequency of the transferee source of power is less than the frequency of the transferor source of power.

9. Apparatus according to claim 8 wherein the load is inductive, and the first range includes phase differences of from −70 degrees to −50 degrees, and the second range includes phase differences of from −10 degrees to +10 degrees.

10. Apparatus according to claim 8 wherein the load includes a motor.

11. Apparatus according to claim 8 wherein said actuating means is responsive to said frequency comparator means and phase comparator means for effecting transfer of the load from the transferor source of power to the transferee source of power when the phase difference between the transferor source of power and the transferee source of power is −60 degrees when the frequency of the transferee source of power is greater than the frequency of the transferor source of power, and said actuating means is responsive to said frequency comparator means and phase comparator means for effecting transfer of the load from the transferor source of power to the transferee source of power when the phase difference between the transferor source of power and the transferee source of power is 0 degrees when the frequency of the transferee source of power is less than the frequency of the transferor source of power.

12. Apparatus for transferring a load from a transferor source of A.C. power to a transferee source of A.C. power while limiting surge current from the transferee source of A.C. power to the load comprising, transfer switch means having an armature, a transferor contact operatively connected to said transferor source of power, a transferee contact operatively connected to said transferee source of power, load contact means operatively connected to said load, and actuating means for moving said armature from a transferor position in engagement with said transferor contact to a transferee position in engagement with said transferee contact for connecting said load to said transferor source and to said transferee source, respectively, transferor frequency monitoring means operatively connected to the transferor source of power for monitoring the frequency of the transferor source of power, transferor phase monitoring means operatively connected to the transferor source of power for monitoring the phase of the transferor source of power, transferee frequency monitoring means operatively connected to the transferee source of power for monitoring the frequency of the transferee source of power, transferee phase monitoring means operatively connected to the transferee source of power for monitoring the phase of the transferee source of power, frequency comparator means operatively connected to the transferor frequency monitoring means and transferee frequency monitoring means for comparing the frequency of the transferor source of power with the frequency of the transferee source of power, phase comparator means operatively connected to the transferor phase monitoring means and transferee phase monitoring means for determining the phase difference between the transferor source of power and the transferee source of power, and actuating means operatively connected to said frequency comparator means and phase comparator means for effecting transfer of the load from the transferor source of power to the transferee source of power when the phase of the transferor source of power is lagging the phase of the transferee source of power by 60 degrees if the frequency of the transferee source of power is greater than the frequency of the transferor source of power, and for effecting transfer of the load from the transferor source of power to the transferee source of power when the transferor source of power and transferee source of power are in phase if the frequency of the transferee source of power is less than the frequency of the transferor source of power.

* * * * *